(12) United States Patent
Zhao et al.

(10) Patent No.: US 12,477,278 B2
(45) Date of Patent: Nov. 18, 2025

(54) MEMS MICROPHONE

(71) Applicant: AAC ACOUSTIC TECHNOLOGIES (SHENZHEN) CO., LTD., Guangdong (CN)

(72) Inventors: Zhuanzhuan Zhao, Shenzhen (CN); Kaijie Wang, Shenzhen (CN); Rui Zhang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 158 days.

(21) Appl. No.: 18/393,754

(22) Filed: Dec. 22, 2023

(65) Prior Publication Data

US 2025/0106560 A1 Mar. 27, 2025

(51) Int. Cl.
*H04R 7/02* (2006.01)

(52) U.S. Cl.
CPC ......... *H04R 7/02* (2013.01); *H04R 2201/003* (2013.01)

(58) Field of Classification Search
CPC ............................. H04R 7/02; H04R 2201/003
See application file for complete search history.

(56) References Cited

U.S. PATENT DOCUMENTS

| | | | |
|---|---|---|---|
| 2014/0314254 A1* | 10/2014 | Conti ..................... | H04R 19/04 381/174 |
| 2018/0152793 A1* | 5/2018 | Jost ........................ | H04R 19/04 |
| 2021/0168497 A1* | 6/2021 | Wen ....................... | H04R 19/005 |
| 2023/0403514 A1* | 12/2023 | Huang ................... | H04R 31/003 |

* cited by examiner

*Primary Examiner* — Suhan Ni
(74) *Attorney, Agent, or Firm* — Wiersch Law Group

(57) ABSTRACT

An MEMS microphone includes a substrate with a back cavity and a capacitor system arranged on the substrate. The capacitor system includes a back plate and a diaphragm opposite to and spaced apart from the back plate. Surface of the back plate facing diaphragm or surface of diaphragm facing the back plate being provided with an anti-adhesion member. When the diaphragm moves until the anti-adhesion member is in contact with the diaphragm and the back plate at the same time, the anti-adhesion member is elastically deformable along a vibrating direction of the diaphragm. The anti-adhesion member of the present disclosure is elastic and may provide cushioning for movement of the diaphragm, which prevents rapid concentration of stress at a position of the diaphragm in contact with the anti-adhesion member, thereby preventing formation of pits in the diaphragm and preventing breakage of the diaphragm under repeated impact of the anti-adhesion member.

8 Claims, 4 Drawing Sheets

MEMS MICROPHONE

TECHNICAL FIELD

The present disclosure belongs to the technical field of acoustics and electronics, and in particular relates to a micro-electro-mechanical system (MEMS) microphone.

BACKGROUND

A traditional MEMS microphone chip structure mainly includes a substrate structure with a back cavity, and a diaphragm and a back plate structure located above the substrate. The diaphragm and the back plate structure form a capacitor system. When sound pressure acts on the diaphragm, there is a pressure difference on two sides of the diaphragm facing the back plate and facing away from the back plate, causing the diaphragm to move close to the back plate or away from the back plate, thereby causing changes in capacitance between the diaphragm and the back plate and converting a sound signal into an electrical signal.

In the related art, when the diaphragm moves close to the back plate under the sound pressure, in order to prevent short-circuiting of the microphone due to contact between the diaphragm and the back plate and to reduce a risk of membrane absorption, a dimple structure may generally be arranged between the back plate and the diaphragm. Dimples may be arranged on the side of the back plate or the diaphragm. However, for the dimples arranged on the side of the back plate, when the diaphragm moves close to or away from the back plate under large sound pressure, pits may be left at a position where the diaphragm directly faces the dimples on the back plate, and repeated actions on the pits may lead to concentration of stress at this position. When the stress exceeds breaking strength of the material of the diaphragm, the diaphragm breaks. Similarly, for the dimples arranged on the side of the diaphragm, due to repeated impact of the diaphragm, pits may also be left at a position where the back plate directly faces the dimples on the diaphragm, which also leaves hidden dangers for the breakage of the back plate.

Therefore, it is necessary to provide a new MEMS microphone to solve the above technical problems.

SUMMARY

The present disclosure is intended to provide a MEMS microphone, which can solve the problem of breakage of the diaphragm under repeated impact of dimples in the related art.

The technical solution of the present disclosure is as follows.

A MEMS microphone includes a substrate with a back cavity and a capacitor system arranged on the substrate. The capacitor system includes a back plate and a diaphragm opposite to and spaced apart from the back plate. A surface of the back plate facing the diaphragm or a surface of the diaphragm facing the back plate is provided with an anti-adhesion member. When the diaphragm moves until the anti-adhesion member is in contact with the diaphragm and the back plate at the same time, the anti-adhesion member is elastically deformable along a vibrating direction of the diaphragm.

In an embodiment, the anti-adhesion member includes a connecting portion connected to the back plate or the diaphragm, a bending portion extending from the connecting portion towards the diaphragm or the back plate, and an abutting portion connected to an end of the bending portion away from the connecting portion, and when the diaphragm moves until the anti-adhesion member is in contact with the diaphragm or the back plate, the abutting portion abuts against the diaphragm or the back plate.

In an embodiment, the capacitor system further includes a first electrode member arranged on a side of the back plate close to the diaphragm, the first electrode member is opposite to and spaced apart from the diaphragm, and the connecting portion of the anti-adhesion member is fixed to a surface at a side of the first electrode member away from the back plate.

In an embodiment, the surface at a side of the first electrode member away from the back plate is flush with the surface of the back plate facing the diaphragm.

In an embodiment, the anti-adhesion member is a spring, and a length of the anti-adhesion member extends along the vibrating direction of the diaphragm.

In an embodiment, the anti-adhesion member is internally hollow or solid.

In an embodiment, the anti-adhesion member is an insulator or at least one end of the anti-adhesion member is an insulating end.

In an embodiment, the MEMS microphone further includes a first insulating layer connected to the substrate and the diaphragm respectively, and a second insulating layer connected to the diaphragm and the back plate respectively, the back plate, the first insulating layer, and the diaphragm together define a sound cavity, and the back plate is provided with a sound hole communicated with the sound cavity.

In an embodiment, the MEMS microphone further includes a protective layer arranged on outer sides of the first insulating layer and the second insulating layer, the protective layer having one side connected to the substrate and the other side extending to be flush with the second insulating layer.

The present disclosure has the following beneficial effects. When the diaphragm vibrates under the large sound pressure until the anti-adhesion member is in contact with the diaphragm and the back plate at the same time, the diaphragm may continue to move under the sound pressure and an electric field force to compress the anti-adhesion member until a restoring force provided by the anti-adhesion member is greater than the electric field force and the sound pressure, a moving speed of the diaphragm is 0, and the diaphragm begins to move away from the back plate. In this process, the anti-adhesion member may provide cushioning for movement of the diaphragm, which prevents rapid concentration of stress at a position of the diaphragm in contact with the anti-adhesion member, thereby preventing formation of pits in the diaphragm and preventing breakage of the diaphragm under repeated impact of the anti-adhesion member.

DESCRIPTION OF EMBODIMENTS

The present disclosure is further described below with reference to the accompanying drawings and embodiments.

Figure 1:
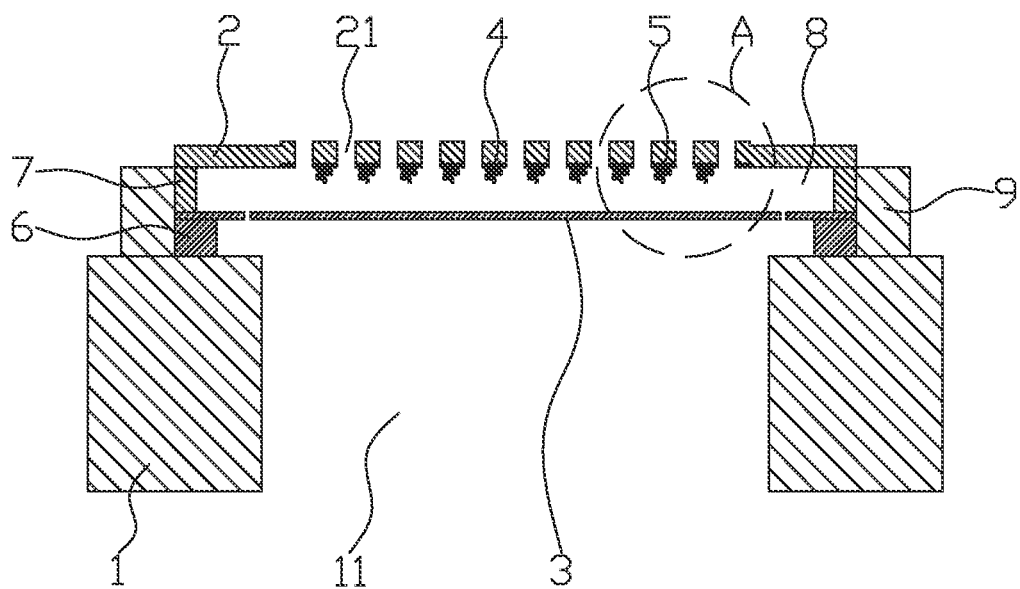
FIG. 1 is a cross-sectional view of an anti-adhesion member arranged on a back plate in a MEMS microphone according to the present disclosure.
Figure 3:
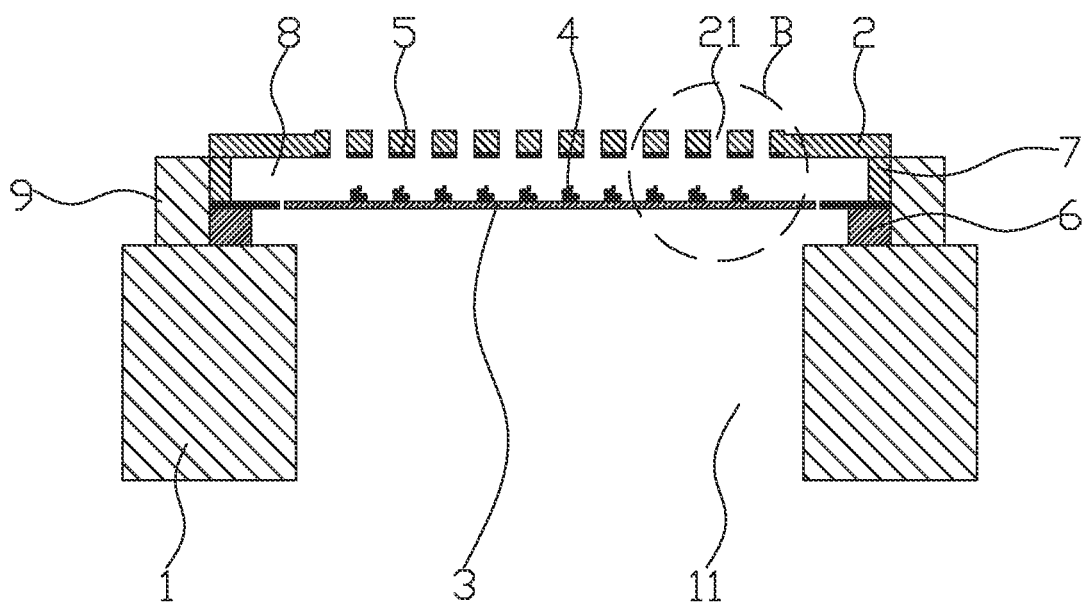
FIG. 3 is a sectional view of the anti-adhesion member arranged on a diaphragm in the MEMS microphone according to the present disclosure.

Referring to FIG. 1 and FIG. 3, an embodiment of the present disclosure provides a MEMS microphone, including a substrate with a back cavity 11 and a capacitor system arranged on the substrate. The capacitor system includes a back plate 2 and a diaphragm 3 opposite to and spaced apart from the back plate 2. A surface of the back plate 2 facing the diaphragm 3 or a surface of the diaphragm 3 facing the back plate 2 is provided with an anti-adhesion member 4. When the diaphragm 3 moves until the anti-adhesion member 4 is in contact with the diaphragm 3 and the back plate 2 at the same time, the anti-adhesion member 4 is elastically deformable along a vibrating direction of the diaphragm 3.

When the diaphragm 3 vibrates under large sound pressure until the anti-adhesion member 4 is in contact with the diaphragm 3 and the back plate 2 at the same time, the diaphragm 3 may continue to move under the sound pressure and an electric field force to compress the anti-adhesion member 4 until a restoring force provided by the anti-adhesion member 4 is greater than the electric field force and the sound pressure, a moving speed of the diaphragm 3 is 0, and the diaphragm 3 begins to move away from the back plate 2. In this process, the anti-adhesion member 4 may provide cushioning for movement of the diaphragm 3, which prevents rapid concentration of stress at a position of the diaphragm 3 in contact with the anti-adhesion member 4, thereby preventing formation of pits in the diaphragm 3 and preventing breakage of the diaphragm 3 under repeated impact of the anti-adhesion member 4.

Figure 2:
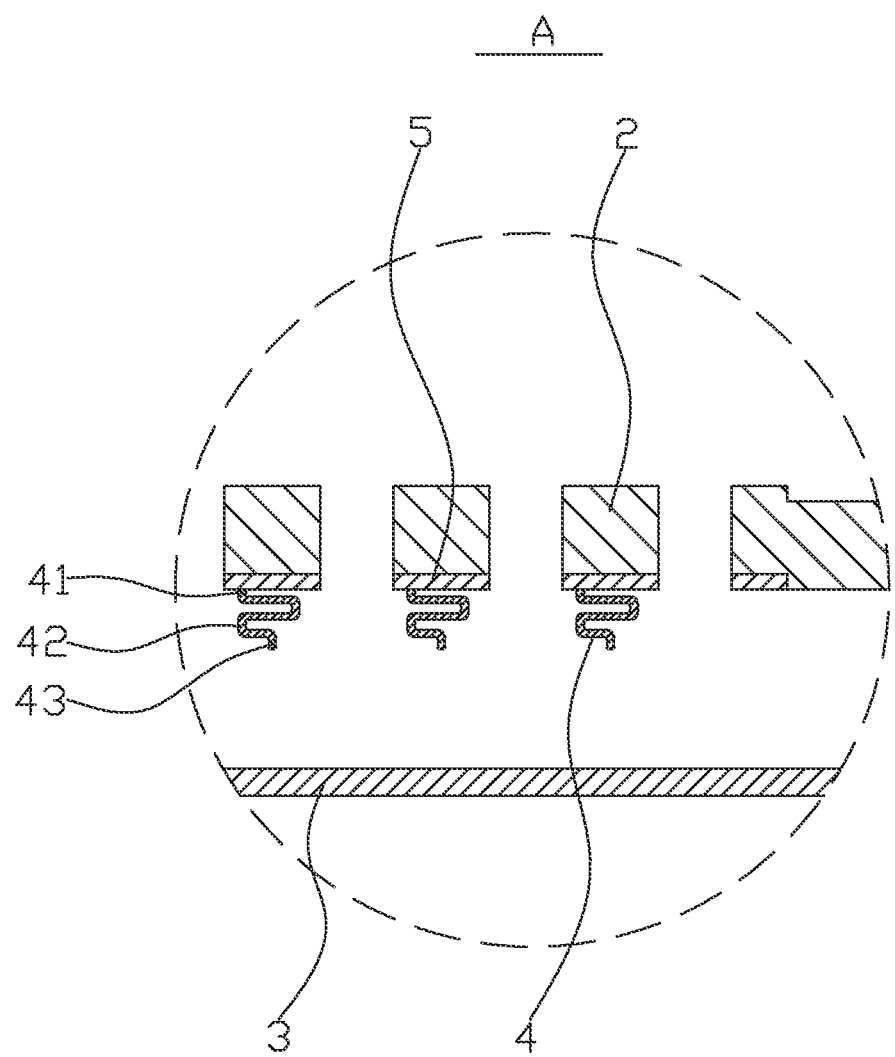
FIG. 2 is an enlarged view of Detail A in FIG. 1.
Figure 4:
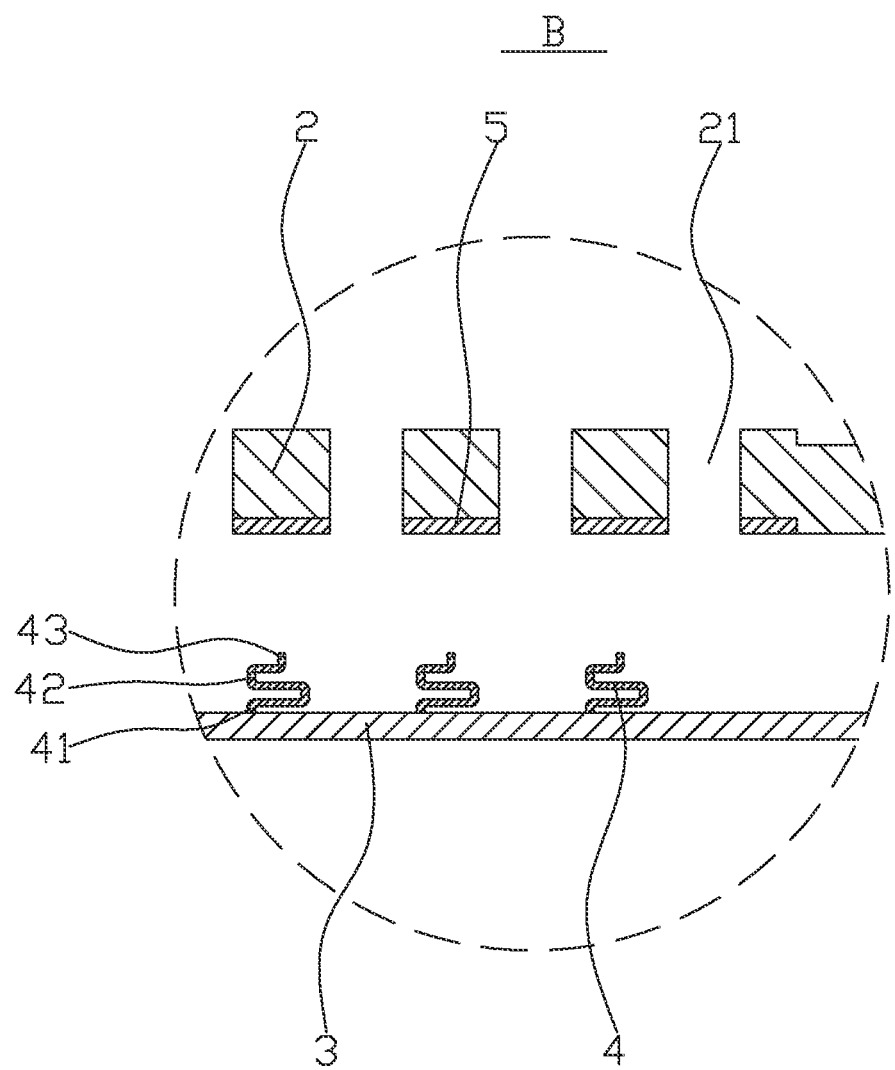
FIG. 4 is an enlarged view of Detail B in FIG. 3.

Referring to FIG. 2 and FIG. 4, in some embodiments, the anti-adhesion member 4 includes a connecting portion 41 connected to the back plate 2 or the diaphragm 3, a bending portion 42 extending from the connecting portion 41 towards the diaphragm 3 or the back plate 2, and an abutting portion 43 connected to an end of the bending portion 42 away from the connecting portion 41, and when the diaphragm 3 moves until the anti-adhesion member 4 is in contact with the diaphragm 3 or the back plate 2, the abutting portion 43 abuts against the diaphragm 3 or the back plate 2. Specifically, there is a gap in the bending portion 42 so that the anti-adhesion member 4 may elastically extend or elastically contract along the vibrating direction of the diaphragm 3, and the anti-adhesion member 4 can provide cushioning for the movement of the diaphragm 3. Two bending portions 42 may be provided. The two bending portions 42 are connected, and the connecting portion 41 and the abutting portion 43 are connected to the two bending portions 42 respectively. The bending portion 42 may be U-shaped to facilitate elastic expansion or contraction of the anti-adhesion member 4 along the vibrating direction of the diaphragm.

It should be understood that a number of the bending portion 42 is set according to an actual requirement, such as one, three, or four. The bending portion 42 may alternatively be V-shaped. The connecting portion 41 and the abutting portion 43 may be connected to a middle portion or an end portion of the bending portion 42. For example, the connecting portion 41 is connected to the end portion of the bending portion 42, and the abutting portion 43 is connected to the middle portion of the bending portion 42.

In some other embodiments, the anti-adhesion member 4 is a spring, and a length of the anti-adhesion member 4 extends along a convex direction to realize elastic extension or contraction of the anti-adhesion member 4 along the convex direction.

The anti-adhesion member 4 is internally hollow or solid, as shown in FIG. 2 and FIG. 4, which is preferably solid, thereby helping to reduce difficulty of manufacturing of the anti-adhesion member 4. A shape of a cross section of the anti-adhesion member 4 may be one or any combination of a circle, a sector, and a polygon, preferably a circle, which can reduce an area of contact between the substrate and the anti-adhesion member 4, thereby reducing an adhesion force between the substrate and the anti-adhesion member 4, effectively preventing an adhesion phenomenon between the diaphragm 3 and the substrate, and improving reliability of the MEMS microphone. A number of the anti-adhesion member 4 is set according to an actual requirement, such as one, three, seven, or ten. All the anti-adhesion members 4 are circumferentially spaced and evenly distributed, which can make stress on the diaphragm 3 or the back plate 2 more uniform, and further prevent breakage of the diaphragm 3 or the back plate 2 due to the stress.

Referring to FIG. 1 and FIG. 3, the capacitor system further includes a first electrode member 5 arranged on a side of the back plate 2 close to the diaphragm 3, and a second electrode member (not shown) arranged on a side of the diaphragm 3 close to the back plate 2. The first electrode member 5 is spaced apart from and opposite to the second electrode member. When the diaphragm 3 vibrates in a direction close to or away from the back plate 2, capacitance of a capacitor between the first electrode member 5 and the second electrode member changes.

Referring to FIG. 1 and FIG. 2, in some embodiments, the anti-adhesion member 4 is fixed to a surface at a side of the first electrode member 5 away from the back plate 2. A plurality of anti-adhesion members 4 may be provided, and the plurality of anti-adhesion members 4 are evenly distributed on the first electrode member 5. Specifically, a side of the back plate 2 close to the diaphragm 3 is provided with a mounting slot (not shown), and the first electrode member 5 is mounted in the mounting slot, so that the surface at a side of the first electrode member 5 away from the back plate 2 is flush with the surface of the back plate 2 facing the diaphragm 3, which helps to prevent contact of the diaphragm 3 with the back plate 2.

Referring to FIG. 3 and FIG. 4, in some other embodiments, the anti-adhesion member 4 is fixed to a side surface of the second electrode member away from the diaphragm 3. A plurality of anti-adhesion members 4 may be provided, and the plurality of anti-adhesion members 4 are evenly distributed on the second electrode member.

In the present disclosure, the first electrode member 5 and the second electrode member are always insulated to ensure that capacitance of the capacitor system can be changed to realize a corresponding function of the microphone.

In some embodiments, the anti-adhesion member 4 is an insulator or at least one end of the anti-adhesion member 4 is an insulating end, so that, when the diaphragm 3 moves until the anti-adhesion member 4 is connected to the diaphragm 3 and the back plate 2 respectively, the diaphragm 3 and the back plate 2 are insulated. The anti-adhesion member 4 may be made of an insulating material as a whole, or one end of the anti-adhesion member 4 is made of an insulating material. For example, an end of the anti-adhesion member 4 connected to the back plate 2 or the diaphragm 3 is made of an insulating material, or two ends of the anti-adhesion member 4 are both made of insulating materials. It should be understood that, when at least one end of the anti-adhesion member 4 is an insulating end, the anti-adhesion member 4 may be a conductor. That is, the anti-adhesion member 4 is made of a conductive material. The insulating end of the anti-adhesion member 4 may be formed by coating with an insulating layer.

It is to be noted that the first electrode member 5 and the second electrode member are both conductors, which are made of polycrystalline silicon doped or monocrystalline silicon doped conductive materials. When the MEMS microphone is powered on, the back plate 2 and the diaphragm 3 may be charged with opposite polarity, forming the capacitor system. When the diaphragm 3 vibrates under the action of a sound wave, a distance between the first electrode member 5 and the second electrode member may change, causing the capacitance of the capacitor system to change, thereby converting a sound-wave signal into an electrical signal and realizing the corresponding function of the microphone.

Referring to FIG. 1 and FIG. 3, the MEMS microphone further includes a first insulating layer 6 connected to the substrate and the diaphragm 3 respectively, and a second insulating layer 7 connected to the diaphragm 3 and the back plate 2 respectively, the back plate 2, the first insulating layer 6, and the diaphragm 3 together define a sound cavity 8, and the back plate 2 is provided with a sound hole 21 communicated with the sound cavity 8. The first insulating layer 6 and the second insulating layer 7 may both be made of semiconductor silicon oxide insulating materials. The first insulating layer 6 may support the diaphragm 3 and ensure insulation between the diaphragm 3 and the substrate. The second insulating layer 7 may support the back plate 2 and ensure insulation between the back plate 2 and the diaphragm 3. The sound hole 21 may connect the sound cavity 8 with an external environment, so that sound-wave airflow can enter or flow out of the sound cavity 8. When pressure (sound wave) acts on the diaphragm 3 through a plurality of sound holes 21, the diaphragm 3 vibrates in a direction close to or away from the back plate 2, so that the capacitance of the capacitor between the diaphragm 3 and the back plate 2 changes, which allows generation of an electrical signal corresponding to a change in the pressure (sound wave). The electrical signal is outputted through an external circuit connected to the capacitor system, ultimately realizing the function of the MEMS microphone.

Referring to FIG. 1 and FIG. 3, the MEMS microphone further includes a protective layer 9 arranged on outer sides of the first insulating layer 6 and the second insulating layer 7, and the protective layer 9 has one side connected to the substrate and the other side extending to be flush with the second insulating layer 7. The protective layer 9 may be made of a material such as monocrystalline silicon, polycrystalline silicon, or silicon nitride. The protective layer 9 may protect the diaphragm 3.

It is to be noted that positions of the back plate 2 and the diaphragm 3 may be adjusted, as long as they can form the capacitor system. That is, the back plate 2 may be located between the diaphragm 3 and the substrate, or the diaphragm 3 may be located between the back plate 2 and the substrate.

The above merely describes embodiments of the present disclosure. It should be pointed out herein that, for those skilled in the art, improvements can be made without departing from the creative concept of the present disclosure, all of which fall within the protection scope of the present disclosure.

What is claimed is:

1. A micro-electro-mechanical system (MEMS) microphone, comprising:
   a substrate having a back cavity; and
   a capacitor system arranged on the substrate,
   wherein the capacitor system comprises a back plate and a diaphragm that is opposite to and spaced apart from the back plate, a surface of the back plate facing the diaphragm or a surface of the diaphragm facing the back plate is provided with an anti-adhesion member;
   wherein the anti-adhesion member is elastically deformable along a vibrating direction of the diaphragm when the diaphragm moves until the anti-adhesion member is in contact with the diaphragm and the back plate at the same time;
   wherein the anti-adhesion member is a spring, and a length of the anti-adhesion member extends along the vibrating direction of the diaphragm.

2. The MEMS microphone as described in claim 1, wherein the anti-adhesion member comprises a connecting portion connected to the back plate or the diaphragm, a bending portion extending from the connecting portion towards the diaphragm or the back plate, and an abutting portion connected to an end of the bending portion away from the connecting portion, wherein the abutting portion abuts against the diaphragm or the back plate when the diaphragm moves until the anti-adhesion member is in contact with the diaphragm or the back plate.

3. The MEMS microphone as described in claim 2, wherein the capacitor system further comprises a first electrode member arranged on a side of the back plate close to the diaphragm, wherein the first electrode member is opposite to and spaced apart from the diaphragm, and the connecting portion of the anti-adhesion member is fixed to a surface at a side of the first electrode member away from the back plate.

4. The MEMS microphone as described in claim 3, wherein the surface at the side of the first electrode member away from the back plate is flush with the surface of the back plate facing the diaphragm.

5. The MEMS microphone as described in claim 1, wherein the anti-adhesion member is internally hollow or solid.

6. The MEMS microphone as described in claim 1, wherein the anti-adhesion member is an insulator, or at least one end of the anti-adhesion member is an insulating end.

7. The MEMS microphone as described in claim 1, further comprising a first insulating layer connected to the substrate and the diaphragm respectively, and a second insulating layer connected to the diaphragm and the back plate respectively, wherein the back plate, the first insulating layer, and the diaphragm jointly define a sound cavity, and the back plate is provided with a sound hole communicated with the sound cavity.

8. The MEMS microphone as described in claim 7, further comprising a protective layer arranged on outer sides of the first insulating layer and the second insulating layer, wherein one side of the protective layer is connected to the substrate, and the other side of the protective layer extends to be flush with the second insulating layer.

* * * * *